Patented July 28, 1953

2,647,086

UNITED STATES PATENT OFFICE 2,647,086

METHODS OF PHOSPHOR MANUFACTURE

Horace H. Homer, Arlington, Mass., assignor to Sylvania Electric Products Inc., Salem, Mass., a corporation of Massachusetts No Drawing. Application March 1, 1950,
Serial No. 147,155

5 Claims. (Cl. 252—301.3)

This invention relates to the manufacture of phosphors, and particularly to phosphors which are adversely affected by oxidation.

I have found that the addition of an easily-decomposable compound to the materials used in making such phosphors reduces or prevents oxidation and increases the brightness of the resulting phosphor. By an "easily-decomposable" compound, I mean one which is easily decomposed by heat to form relatively inert gases, preferably of a slightly reducing nature, with no solid residue. Ammonium oxalate, for example, is such a compound, decomposing into ammonia, the oxides of carbon, and water vapor. The formates and oxalic acid are additional examples of such compounds; they are mentioned by way of explanation and not by way of limitation. Other such compounds may be used.

While the invention will be described as applied to a calcium cadmium phosphate phosphor, for convenience, the invention is not limited to that phosphor but is generally applicable to other phosphors containing oxidizable elements as activators.

Calcium cadmium phosphate, for example, may be activated with lead and manganese, both of which are susceptible to oxidation with deleterious results to the phosphor. The application of my invention to the manufacture of this phosphor improves the brightness and red emission, prevents the formation of an inert or discolored skin on the phosphor particles, and makes the fired phosphor cake softer and more easily pulverizable.

In accordance with the invention, I may for example, mix intimately together the following finely-powdered ingredients:

274 grams $CaHPO_4$
150 grams $CdCO_3$
11.5 grams $MnCO_3$
5.3 grams $PbCO_3$
4.3 grams $(NH_4)_2C_2O_4 \cdot H_2O$ The mixture may be fired in an inert atmosphere such as nitrogen, for example, at high temperature, say 1975° C., for a period sufficient for activation, for example an hour.

A series of similar mixtures, with differing percentages by weight of $(NH_4)C_2O_4 \cdot H_2O$ in the total mixture, gave the following results:

| Percent Oxalate | Red Component | Brightness | Remarks |
|---|---|---|---|
| 0 | 48 | 12.7 | Yellow Skin. |
| ½ | 48 | 12.7 | White. |
| 1 | 51.3 | 10.9 | White, faint trace inert skin. |
| 3 | 51.3 | 10.9 | Pink, inert skin. |
| 5 | 48.5 | 10.9 | Pink, considerable inert skin. |

The above table is for sixty minutes firing at 1975° F., and indicates that the range between 0.5% and 1% is best for the combination of advantages of high red component, maximum brightness and absence of seriously discolored skin. It will also give a soft and easily-pulverizable cake.

The temperature and time of firing could be varied without much change in the red component value or in the total brightness, as shown in the following table:

| Percent Oxalate | Temp., °F. | Time, min. | Red Component | Brightness |
|---|---|---|---|---|
| 1 | 1,975 | 60 | 51.0 | 11.6 |
| 1 | 1,975 | 36 | 50.7 | 11.3 |
| 1 | 1,950 | 60 | 51.3 | 11.6 |

The ingredients shown in my preferred formula for a calcium-cadmium phosphor may, of course, be varied. The cadmium compound may be an oxide or a compound reducible to the oxide, and the same is true also of the lead and manganese compounds, which may also be non-oxygenous compounds, for example, halides, if desired.

While the invention has been described with reference to a particular phosphor, this is not by way of limitation. The invention is generally applicable to other phosphors containing oxidizable elements as activators.

As will be seen from the examples, the use of a compound such as ammonium oxalate is helpful even when a presumably inert atmosphere is produced in the firing furnace by flowing nitrogen therethrough. This may be because of the difficulty in preventing air leakage into a furnace, or because of the more intimate contact with the phosphor when the inert atmosphere is produced by decomposition of a product directly in the mixture being fired, or because the atmosphere so produced is slightly reducing.

What I claim is:

1. In the method of making a phosphor of a type to which oxidation is deleterious, the steps of mixing with the ingredients necessary to form the phosphor about ½% to 1% by weight of a compound easily decomposable by heat to relatively inert gases free from any solid residue and selected from the group consisting of ammonium formate, ammonium oxalate and oxalic acid, and firing the resultant mixture to form the phosphor.

2. In the method of making a phosphor of a type to which oxidation is deleterious, the steps of mixing about ½% to 1% by weight of ammonium oxalate with the ingredients necessary to form the phosphor, and then firing the resultant mixture to form the phosphor.

3. In the method of making a phosphor of a type to which oxidation is deleterious, the steps of mixing about ½% to 1% by weight of ammonium formate with the ingredients necessary to form the phosphor, and then firing the resultant mixture to form the phosphor.

4. In the method of making a phosphor of a type to which oxidation is deleterious, the steps of mixing about ½% to 1% by weight of oxalic acid with the ingredients necessary to form the phosphor, and then firing the resultant mixture to form the phosphor.

5. The process of making a calcium-cadmium phosphate phosphor which comprises mixing together in the proportions necessary to form said phosphor a cadmium compound, secondary calcium phosphate, a manganese activating compound, a lead activating compound, and between about ½% and 1% of ammonium oxalate, and firing the same to form the phosphor.

HORACE H. HOMER.

References Cited in the file of this patent

UNITED STATES PATENTS

| Number | Name | Date |
|---|---|---|
| 2,408,621 | Froelich | Oct. 1, 1946 |